United States Patent [19]

Trujillo et al.

[11] 4,210,261

[45] Jul. 1, 1980

[54] CONTROLLABLE LIQUID DISPENSER

[75] Inventors: John J. Trujillo, Castro Valley; Timothy E. Brown, Danville, both of Calif.

[73] Assignee: LST Electronics, Inc., Berkeley, Calif.

[21] Appl. No.: 885,655

[22] Filed: Jun. 12, 1978

Related U.S. Application Data

[63] Continuation-in-part of Ser. No. 834,571, Sep. 19, 1977.

[51] Int. Cl.² .............................................. B67D 5/22
[52] U.S. Cl. ..................................... 222/43; 222/47; 222/309; 222/385
[58] Field of Search ...................... 222/41, 43, 46, 47, 222/49, 309, 385, 383, 372; 239/333

[56] References Cited

U.S. PATENT DOCUMENTS

| 2,069,076 | 1/1937 | Majewski | 222/385 |
| 2,575,508 | 11/1951 | Balletto | 222/385 |
| 3,430,813 | 5/1969 | Gilmont | 222/43 |
| 3,653,556 | 4/1972 | Moran et al. | 222/309 |

Primary Examiner—H. Grant Skaggs
Attorney, Agent, or Firm—Alvin E. Hendricson

[57] ABSTRACT

An improved liquid dispenser has two concentrically spaced cylinders with a pump plunger fitting the inner cylinder, an inlet check valve at the bottom of the outer cylinder, and an outlet check valve adjacent the top of the outer cylinder with a graduated stem extending upwardly from the plunger through a cap structure adapted to engage the open top of a liquid container. The pump plunger is restrained from moving upwardly out of the inner cylinder and a collar is adjustably mounted on the stem above the cap for setting the pump stroke as indicated by the graduations on the stem to thus provide a dispenser adapted to fit containers having a small opening therein.

5 Claims, 2 Drawing Figures

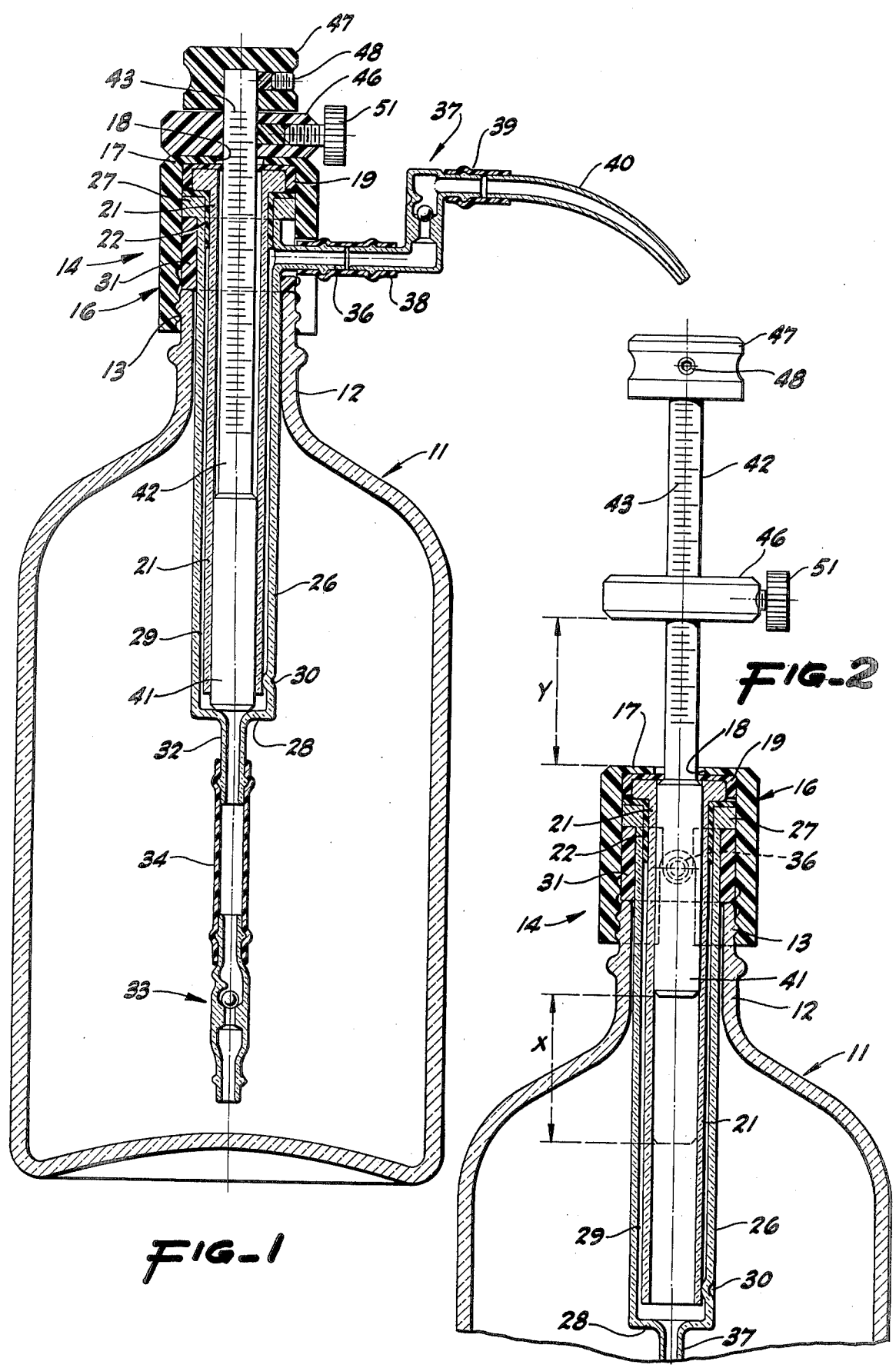

CONTROLLABLE LIQUID DISPENSER

This is a continuation-in-part of the copending prior patent application of John J. Trujillo filed Sept. 19, 1977, under Ser. No. 834,571 and entitled Adjustable Metering Liquid Dispenser.

BACKGROUND OF INVENTION

There have been developed a variety of different dispensers for metering and dispensing liquid from a container, such as a bottle. One advantageous dispenser is described and claimed in U.S. Pat. No. 4,057,174, however, this and other metering dispensers employing gauge rods are only adapted for use with wide mouth bottles. Many bottles adapted to contain liquid chemicals, for example, have narrow necks with only small openings therethrough. The present invention provides an improved structure adapted to fit narrow mouth containers and yet dispense precisely controlled amounts of liquid.

DESCRIPTION OF FIGURES

The present invention is illustrated with respect to a preferred embodiment thereof in the accompanying drawing wherein:

FIG. 1 is a central vertical sectional view of a preferred embodiment of the invention mounted upon a bottle; and FIG. 2 is a partial sectional view taken in a plane at right angles to the plane of FIG. 1 and illustrating the invention with the pump plunger raised a controlled distance for dispensing a predetermined volume of liquid from a bottle.

DESCRIPTION OF PREFERRED EMBODIMENT

The present invention provides a dispenser unit adapted to engage the top of a liquid container, such as a bottle having a small neck and provides the capability of pumping or dispensing precise amounts of liquid from the container. Referring to the drawings, there will be seen to be illustrated a conventional liquid container 11 in the form of a bottle having a small upstanding neck 12 with external threads 13 thereabout. A dispenser 14 in accordance with the present invention is adapted to fit into the bottle 11 through the neck 12 thereof and to engage the neck in closing relation thereto. The dispenser is shown to include a cylindrical cap 16 having internal threads adapted to engage the threads 13 about the bottle neck 12. Within the cap 16, there are provided a plurality of elements which depend from the open end of the cap and are adapted thus to be inserted in the container or bottle 11, as illustrated in the drawing. These elements include a manually operable pump and a gauge rod for adjusting the pump stroke.

The upper end of the dispenser cap 16 is closed by a top wall 17 having a central aperture 18 therethrough. Immediately beneath the top wall 17, there is disposed an apertured retainer disc 19 having a depending rim thereabout, and a top flange about a hollow pump cylinder or inner cylinder 21 slidably fits within the rim of this disc 19. A flanged cylindrical seal 22 fits tightly about the pump cylinder 21 with the cylinder flange of the seal extending outwardly beneath the upper flange on the pump cylinder, as illustrated.

The dispenser furthermore includes an outer depending cylinder 26 having an outwardly extending flange 27 about the top thereof disposed about the pump cylinder with this flange engaging the under side of the flange on the sealing cylinder 22. The outer cylinder 26 has an inner diameter which is slightly greater than the outer diameter of the pump cylinder 21. The outer cylinder 26 also has a sufficient length to dispose a bottom wall 28 thereof in spaced relationship below the open bottom end of the pump cylinder 21 when the dispenser elements are assembled. Alternatively, the bottom wall 28 of the outer cylinder may engage the bottom of the pump cylinder 21 which has slots or apertures thereabout for passage of liquid therethrough. The flange on sealing cylinder 22 has a thickness of the depending wall thereof equal to the difference in radius of the exterior of the pump cylinder and interior of the outer cylinder so as to tightly fit between the cylinders at the top of the outer cylinder, as illustrated. The sealing cylinder will thus be seen to close off the annular space 29 between the cylinders 21 and 26 at the top thereof. Alignment of the inner and outer cylinders 21 and 26 may be improved by forming a number of small bumps 30 about the interior of cylinder 26 near the bottom of the pump cylinder 21 to engage the latter at spaced points thereabout. Within the cap 16 there is also provided a short hollow open-ended cylinder 31 dimensioned to slidably engage the exterior of the outer cylinder 26 beneath the top flange 27 thereof for engaging the flange of seal 22 and the upper surface of the bottle neck 12 when the dispenser is assembled and connected to the bottle. This cylinder 31 acts as a spacer to vertically compress the assembly together when the cap is threaded onto the bottle neck.

The outer cylinder 26 of the dispenser hereof is provided with a short tube 32 depending from a central opening in the bottom wall 28 of the outer cylinder, and an inlet valve 33 is attached in depending relationship to this tube as by a plastic connector 34. The inlet valve 33 may comprise a conventional check valve, and the inlet end of this valve is adapted to be positioned adjacent the bottom of the container or bottle 11 whereby fluid may be drawn into the dispenser of the present invention from the bottom of the container. The outer cylinder 26 is also provided with a discharge tube 36 extending laterally from an opening in the outer cylinder adjacent the top thereof and spaced from the top a distance substantially equal to the length of the flanged sealing cylinder 22 so that the cylinder will not close off the lateral opening in the outer cylinder. The outlet tube 36 extends laterally through a vertical slot in the cylinder 31 and through a vertical slot in the cap 16, as shown in FIG. 1 of the drawings. Exteriorly of the cap, there is provided an outlet check valve 37 which may be of conventional design with the ball check disposed vertically and having horizontally extending inlet and outlet portions below and above same, as illustrated. A plastic connector 38 may be employed to join the check valve with the outlet tube 36 and a small diameter outlet connector 39 may be attached to the outlet side of the check valve to receive a small spout or the like 40.

In addition to the foregoing elements of the present invention, there is also provided a pump plunger 41 which slidably fits within the pump cylinder 21 and which has an upstanding gauge rod 42 of smaller diameter than the plunger extending upwardly therefrom through the retainer disc 19 and through the top aperture 18 of the cap 16. It is noted that the aperture in the retainer disc 19 has a smaller cross section than the pump plunger so as to retain the plunger in the pump cylinder. The gauge rod is provided with graduations or markings 43 thereon which are related to the volume displaced by incremental movement of the pump plunger in the pump cylinder to thus indicate volumes of liquid displaced by each distance of pump stroke. The gauge rod 42 above the cap 14 extends through a collar 46 in slidable relation thereto and into a top knob 47 whereat the rod may be secured as by a small threaded element extending laterally through the knob into engagement with the top of the rod. The collar 46 on the gauge rod 42 is adapted to be adjustably positioned thereon as by a thumb screw or the like 51 threaded laterally into the collar so as to be capable of bearing directly or indirectly upon the rod and fixing the location of the collar thereon. It will be noted from the drawings that the under side of the top knob 47 is aligned with the top graduation or marking 43 on the gauge rod, and the upper surface of the collar 46 is employed as marker for indicating the volume of fluid to be dispensed by each operation of the present invention.

Considering now the assembly of elements described above, it is noted that the retainer disc 19 with the pump cylinder flange therein, together with the sealing cylinder 22 atop the outer cylinder flange 27, and the spacing cylinder 31, beneath this outer cylinder flange 27, are all fitted within the cap 14, as illustrated in FIG. 1 of the drawings. The cap is then fitted on the neck 12 of the bottle 11 to position the dispenser atop the cap with the pump inlet means therefor depending into the bottle. In this assembled condition, it will be noted that the exterior of the outer cylinder 26, which fits into the neck of the bottle, is sealed by engagement of the cylinder flange 27 and upper surface of the spacing cylinder 31. It is further noted, with regard to sealing of the dispenser hereof atop a container, that the outer cylinder 26, pump cylinder 21, and pump plunger 41, may be formed of glass and the disc 19, sealing cylinder 22 and spacing cylinder 31 may then be formed of a plastic, such as Teflon to tightly seal against the glass surfaces. The inner and outer cylinders 21 and 26 are sealed together by the sealing cylinder 22 and the gauge rod is sealed by a tight sliding fit of the pump plunger 41 within the pump cylinder 21. Threading of the cap onto the bottle neck tightens the above-described elements of the present invention together into sealing relationship.

With the dispenser attached to the top of a container, such as the bottle 11 of FIG. 1, the present invention may be operated to successively dispense precisely predetermined volumes of liquid from the bottle. Operation of the present invention is accomplished first by completely purging the system wherein the knob 47 in its full down position is gripped by an operator and is then moved upwardly so that the pump plunger is raised in the pump cylinder to draw liquid upwardly through the inlet valve 33 into the interior of the pump cylinder. The knob 47 is then depressed to force the pump plunger downwardly to its lowest down position, i.e., beyond the wall of cylinder 21, so that liquid in the pump cylinder is forced upwardly about the pump cylinder within the outer cylinder 26. This process is repeated until all air has been forced from the system and liquid from the bottle is ejected through the outlet valve 37. It is noted in this respect that the flanged cylinder 22 extends downwardly from the top of the outer cylinder 26 into alignment with the top of the outlet to 36 thereof, as shown in FIG. 1 of the drawings, in order to preclude any entrapment of air above this outlet tube.

With the system thoroughly purged and the pump cylinder raised, as shown in FIG. 2, the operator then loosens the thumb screw 51 and raises the gauge rod 42 by the knob 47 with the collar remaining atop the cap until the top of the collar 46 is aligned with the particular marking 43 in the gauge rod which indicates the desired volume of liquid to be dispensed in the next stroke of the pump. The thumb screw is then tightened with the collar 46 still resting upon the top of the cap 16. The dispenser is then operated by further raising the knob 47 to draw the pump plunger upward so that the top of the plunger engages the underside of the retaining disc 19. It is again noted that the pump plunger is restrained within the pump cylinder by the retaining disc 19 so as to establish the maximum stroke of the pump. With the pump plunger pulled upwardly as far as possible, the knob 47 is then depressed to move knob 47, the gauge rod 42, pump plunger 41, and the collar 46 downwardly, until the collar engages the top of the cap. This stroke of the pump will force liquid out of the pump cylinder and upwardly about the pump cylinder within the outer cylinder through the outlet 36 and the check valve 37 to dispense the predetermined volume of liquid from the bottle. Each successive stroke of the pump, as limited by the setting of the collar 46 on the gauge rod 42 will dispense this same volume of liquid very precisely.

It will be seen that adjusting the position of the collar 46 on the gauge rod 42 will set the maximum stroke of the pump for each operation thereof. Each time the pump is manually operated, this adjustable maximum stroke is completed to thereby dispense the volume of liquid established by the setting of the collar 46 on the gauge rod 42. The present invention provides for disposition of a gauge rod within a pump cylinder to thereby minimize the lateral dimensions of the dispenser so that a dispenser formed in accordance with the present invention may be readily inserted in a narrow opening, such as a small neck of a bottle or other type of container.

In FIG. 2 of the drawings, there is illustrated the present invention in process of operation wherein the collar 46 is shown to be engaged with the gauge rod 42 at an intermediate position thereon. In this illustration, the pump plunger will be seen to have been raised to its uppermost limit of travel whereat the top of the plunger engages the under side of the retainer disc 19. The plunger 41 may thus be moved downwardly in the pump cylinder 21 a distance X which is equal to the distance Y between the bottom of disc 46 and the top of cap 16. The markings 43 on the gauge rod 42 are numbered from bottom to top, inasmuch as the higher the collar is located on the rod, the greater the volume of liquid that is dispensed by each adjusted pump stroke. Additionally, the markings 43 indicate the available pump stroke and thus the volume of liquid to be dispensed with the collar located at any such marking.

Although the present invention has been illustrated with respect to a single preferred embodiment thereof, numerous modifications and variations are possible within the spirit of the invention and thus it is not intended to limit the invention to precise details of illustration or terms of description.

What is claimed is:
1. A controllable dispenser of liquids comprising
a cap adapted to engage the open top of a container,
a pair of radially spaced concentric cylinders depending from said cap with the inner cylinder having open ends and the outer cylinder having an inlet valve depending from the bottom thereof and an outlet valve adjacent the top thereof, a pump plunger slidably disposed within said inner cylinder for movement longitudinally thereof to pump fluid and having a graduated gauge rod extending upwardly therefrom through said cap, means in said cap limiting maximum upward movement of said pump plunger, and a collar adjustably engaging said gauge rod above said cap for precise setting of the maximum pump plunger movement for each stroke to control the volume of liquid displaced by each plunger stroke.

2. The dispenser of claim 1 further defined by said pair of cylinders each having a flanged top, a sealing cylinder disposed between said pair of cylinders adjacent the tops thereof and having a flange thereabout tightly fitted between the flanged tops of said pair of cylinders for sealing the annular space between said pair of cylinders adjacent the top thereof whereby pump plunger reciprocation draws a fluid into the bottom of the inner cylinder and expels fluid up said annular space and out through said outlet valve.

3. The dispenser of claim 2 further defined by said sealing cylinder extending downwardly in the annular space between said pair of cylinders to the top of an outlet valve opening in said outer cylinder, 4. The dispenser of claim 1 further defined by said cap comprising a hollow cylinder with an apertured top wall for extension of said gauge rod therethrough and having internal threads about an open bottom end thereof for engagement with threads on the neck of a container, said pair of cylinders each having flanged open ended tops, sealing means disposed between the flanged top of said cylinders and beneath the flanged top of said outer cylinder for tightening by threaded engagement of the cap with the neck of a container.

5. The dispenser of claim 1 further defined by said pump plunger being movable in said inner cylinder between a lower position engaging the bottom end of said outer cylinder and a raised position engaging a restriction in said cap comprising said means limiting upward movement of said plunger, and said pump plunger and gauge rod having a total length slightly greater than the length of the outer cylinder plus the thickness of the top of said cap and the thickness of said collar, with an expanded top on said gauge rod normally contacting said collar with the collar in contact with said cap in the lower position of said plunger for minimizing the extent of said dispenser above a neck of a container.

* * * * *